United States Patent Office 3,505,344
Patented Apr. 7, 1970

3,505,344
CERTAIN SUBSTITUTED-2-OXO-1(2H)-PYRIDYL CARBOXAMIDES
Jacqueline S. Kelyman, Midland, Mich., assignor to The Dow Chemical Company, Midland, Mich., a corporation of Delaware
No Drawing. Original application Apr. 1, 1968, Ser. No. 717,909. Divided and this application May 12, 1969, Ser. No. 841,174
Int. Cl. C07d *31/48*
U.S. Cl. 260—294.8       7 Claims

ABSTRACT OF THE DISCLOSURE

Disclosed are, as new compounds, certain 2-pyridylcarbamates and 2-oxo-1-pyridylcarboxamides which contain at least one ring bearing thioether, sulfinyl or sulfonyl grouping and are otherwise optionally ring substituted with halogen or alkyl, compositions incorporating such compounds and methods utilizing such compounds and compositions as parasiticides.

---

This application is a divisional of S.N. 717,909 filed Apr. 1, 1968.

The present invention is concerned with novel and useful 2-pyridylcarbamates and 2-oxo-1-pyridylcarboxamides which can be respectively represented by the following formulas (A) and (B):

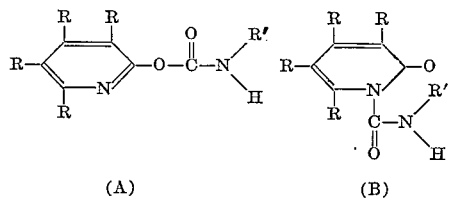

In these and succeeding formulas, R' represents lower alkyl, phenyl, or o-tolyl and one R on each ring moiety represents lower alkylthio, lower alkylsulfinyl or lower alkylsulfonyl which occupies one of the 3, 5 or 6 positions on the ring moiety (using conventional ring numbering, the nitrogen being designated position 1) and the remaining R's represent hydrogen, bromo, chloro or lower alkyl.

The term "lower alkyl" is employed in the present specification and claims to define an alkyl group containing from 1, to 2, to 3 and up to and including 4 carbon atoms, including the various structural isomers thereof; that is to say, methyl, ethyl, n-propyl, isopropyl, n-butyl, s-butyl, isobutyl and t-butyl.

The products of the present invention are crystalline solids which are somewhat soluble in many organic solvents and water. They are useful as parasiticides for the control of a wide variety of mite and insect pests such as flies, ascarids, roaches and so forth. Representative 2-pyridylcarbamates and 2-oxo-1(2H)-pyridylcarboxamides include:

N-methyl-3-(n-propylthio)-4,6-dibromo-5-(n-butyl)-2-pyridylcarbamate,
N-(n-propyl)-3-chloro-6-(n-propylsulfonyl)-2-pyridylcarbamate,
N-isopropyl-3,4,6-trichloro-5-ethylsulfinyl-2-pyridylcarbamate,
N-methyl-3,4,5-trimethyl-6-methylthio-2-pyridylcarbamate,
N-(n-butyl)-3,6-dichloro-5-ethylthio-2-pyridylcarbamate
N-methyl-3,4,5-tribromo-6-isopropylthio-2-pyridylcarbamate,
N-methyl-3-isopropylsulfonyl-2-pyridylcarbamate,
N-(n-propyl)3,4-dibromo-5-(n-butylthio)-2-pyridylcarbamate,
N-isopropyl-3-isopropylsulfinyl-2-pyridylcarbamate,
N-(n-propyl)-3,5-diethyl-6-(n-butylsulfinyl)-2-pyridylcarbamate,
N-phenyl-5-chloro-6-methylsulfonyl-2-pyridylcarbamate,
N-methyl-2-oxo-3,4,6-tribromo-5(n-butylthio)-1(2H)-pyridylcarboxamide,
N-ethyl-2-oxo-3-chloro-4,6-dimethyl-5-isopropylthio-1(2H)-pyridylcarboxamide,
N-ethyl-2-oxo-3-(n-butylsulfinyl)-1(2H)-pyridylcarboxamide,
N,6-dimethyl-2-oxo-5-(n-propylsulfinyl)-1(2H)-pyridylcarboxamide,
N-(n-propyl)-2-oxo-6-isopropylsulfonyl-1(2H)-pyridylcarboxamide,
N-ethyl-2-oxo-3-ethyl-4,6-dichloro-5-ethylsulfonyl-1(2H)-pyridylcarboxamide,
N-(s-butyl)-2-oxo-6-ethylthio-1(2H)-pyridylcarboxamide,
N-(t-butyl)-2-oxo-3-bromo-5-methylsulfonyl-6-methyl-1(2H)-pyridylcarboxamide,
N,4,6-trimethyl-2-oxo-3-bromo-5-methylsulfonyl-1(2H)-pyridylcarboxamide,
N-isopropyl-2-oxo-3-ethylthio-5-chloro-1(2H)-pyridylcarboxamide, and
N-(o-tolyl)-2-oxo-5-ethylsulfonyl-1(2H)-pyridylcarboxamide.

The compounds of the present invention are prepared by reacting together a 2-pyridinol of the formula:

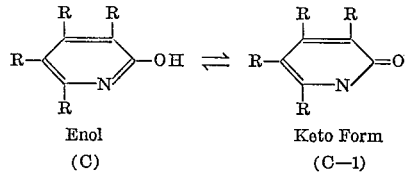

Enol        Keto Form
(C)         (C—1)

and an isocyanate of the formula:

The reaction generates the production of a mixed product consisting of the 2-pyridylcarbamates of Formula (A) and the 2-oxo-1(2H)-pyridylcarboxamides of Formula (B). The choice of starting pyridinol and its manner of substitution, however, dictates a certain predominance in product result. Thus, the 2-pyridinol starting materials having a substituent identified as a lower alkylthio, lower alkylsulfinyl, or lower alkylsulfonyl (one R) at the 6-position on the pyridine ring afford the production of predominant amounts of the corresponding carbamates. In those instances in which the 2-pyridinol starting materials bear the lower alkylthio, lower alkylsulfinyl, or lower alkylsulfonyl (one R) identified substituent in either the 3- or 5-positions on the pyridine ring, the reaction results in the production of predominant amounts of the corresponding carboxamides. Upon completion of the reaction, the mixed reaction product is treated so as to separate and isolate the respective entities via any one of several conventional techniques including fractional recrystallization and chromatography.

In using the fractional recrystallization technique, advantage is taken of the relative solubilities of the two components in a solvent. Examples of such are various mixtures of petroleum ether solvents having a boiling range of from about 30° C. to 60° C. and those having a boiling range of from about 60° C. to 70° C. each together with other organic solvents, such as benzene, diethyl ether, and the like. By forming a solution of the product mixture with these solvents and thereafter continuously and gradually cooling such, the less soluble component crystallizes and can be removed by filtration. Subsequently, the other component can be recovered.

Oftentimes, repeated recrystallization procedures are necessary to achieve the desired degree of separation.

Column chromatography also uses the differing physical property of solubility or adsorption of the two components to achieve separation. In this method, a solution of the product mixture is percolated through a column of adsorbent material, the components being adsorbed in bands spaced according to their different solubility in the particular solvent employed. Subsequent elution achieves the separation. Any of the common adsorbents such as alumina, silica, magnesium oxide, cellulose, and the like can be used. Inert absorbents, such as "Florisil," are preferred. Representative eluant solvents include, for example, methylene chloride, benzene, toluene, etc., or mixtures thereof.

Conveniently, the reaction between the 2-pyridinol and isocyanate is carried out in a liquid reaction medium which is inert to and does not compete with the reactants. Representative media for such purposes include methylene chloride, dimethylformamide, tetrahydrofuran and the like. The reaction is catalyzed by small and catalytic amounts of tertiary amines such as pyridine and the trialkylamines, trimethylamine, triethylamine and tributylamine. Where optimum yields and minimal reaction periods are desired, the reaction is carried out while employing such a catalyst. The reaction proceeds smoothly at the temperature range of from 0° to 70° C. Some of the isocyanate starting materials boil within this range so that the temperatures to be employed with such isocyanates are those which are compatible with their boiling temperatures. The amounts of the reactants to be employed are not critical, some of the desired products being obtained when employing any proportions of the reagents. However, the reaction consumes the reagents in the proportion of one mole of 2-pyridinol with each mole of isocyanate and the employment of such proportions or an excess of the isocyanate in the amount of up to two to four moles or more of isocyanate is usually preferred.

In carrying out the reaction, the 2-pyridinol, isocyanate and catalyst, if employed, are mixed together in any convenient manner. In a preferred procedure, the isocyanate is added portionwise to the pyridinol and catalyst, if employed, dispersed in a liquid reaction medium. The mixing and contacting of such reagents is carried out at a temperature of from 0° to 70° C. and preferably at a temperature of from about 15° to 70° C. Following the contacting of such reagents, the reaction mixture can be set aside for a period of time to ensure completion of the reaction. Upon completion of the reaction, the reaction mixture is processed as previously described to separate and isolate the desired products.

The following examples serve further to typify the nature of the present invention and the manner by which it can be practiced but, as such, are not to be construed as limitations upon the overall scope hereof.

EXAMPLE 1

Methyl isocyanate (13 grams; 0.23 mole) is added portionwise at room temperature with stirring to a mixture of 10 grams (0.054 mole) of 6-ethylsulfonyl-2-pyridinol and 4 drops of triethylamine which are dispersed in 350 milliliters of methylene chloride. This addition is conducted gradually, at room temperature, and over a period of about 10 minutes. Following this addition, the stirring is discontinued and the resulting mixture is permitted to stand at room temperature for eight days. The mixture, which contains the N-methyl-6-ethylsulfonyl-2-pyridylcarbamate and N-methyl-2-oxo-6-ethylsulfonyl-1(2H)-pyridylcarboxamide products, is then evaporated to dryness and the resulting residue is recrystallized from benzene:diethyl ether to obtain the N-methyl-6-ethylsulfonyl-2-pyridylcarbamate product as a white crystalline solid. This product has a melting point of 79°–80° C. Elemental analysis.—Calculated for $C_9H_{12}N_2O_4S$ (percent): C, 44.25; H, 4.95; S, 13.12. Found (percent): C, 44.60; H, 4.86; S, 13.13.

EXAMPLE 2

6-ethylsulfinyl-2-pyridinol (10 grams; 0.059 mole) and 4 drops of triethylamine are dispersed in 325 milliliters of methylene chloride. To the resultant mixture is slowly added with stirring 7.5 grams (0.13 mole) of methyl isocyanate. This addition takes place over a period of 15 minutes and at room temperature. After allowing the resulting mixture to stand at room temperature for 3 days, this mixture containing the mixed product N-methyl-6-ethylsulfinyl - 2 - pyridylcarbamate and N-methyl-2-oxo-6-ethylsulfinyl - 1(2H) - pyridylcarboxamide, is evaporated under vacuum to dryness. The resulting residue is repeatedly recrystallized from a mixture of diethyl ether and petroleum ether (boiling at 60° to 70° C.) to obtain the N-methyl-6-ethylsulfinyl-2-pyridylcarbamate product as a crystalline solid melting at 85.5° to 88° C. Elemental analysis.—Calculated for $C_9H_{12}N_2O_3S$ (percent): C, 47.35; H, 5.30; S, 14.04. Found (percent): C, 47.61; H, 5.13; S, 14.02.

EXAMPLE 3

Ten grams (0.055 mole) of 4,6-dimethyl-5-methylthio-2-pyridinol and 4 drops of trimethylamine are dissolved in 300 milliliters of benzene. To this mixture are added 10 grams (0.175 mole) of methyl isocyanate with stirring. The resultant mixture is warmed to about 35° C. for about 1 hour and thereafter kept at room temperature for 24 hours. It is then evaporated to dryness under vacuum and a fraction of the resultant residue is recrystallized 8 times from a mixture of diethyl ether and petroleum ether (boiling at 60° to 70° C.), to obtain the N-methyl-4,6-dimethyl-5-methylthio-2-pyridylcarbamate and N-methyl-4,6 - dimethyl - 5 - methylthio-1(2H)-pyridylcarboxamide products.

The remaining fraction of residue is dissolved in a mixture of benzene and methylene chloride and this solution is eluted through a chromatography column packed with "Florisil" adsorbent. This is developed with additional benzene:methylene chloride. The first fractions collected are evaporated to dryness and the residue recrystallized from benzene:ether to give the N-methyl-4,6-dimethyl - 5 - methylthio-1(2H)-pyridylcarboxamide product (molecular weight 226.7). The latter fractions are similarly treated to provide the N-methyl-4,6-dimethyl-5-methylthio-2-pyridylcarbamate product (molecular weight 227.2).

EXAMPLE 4

To a mixture of 15 grams (0.08 mole) of 3-ethylthio-5-chloro-2-pyridinol and 4 drops of triethylamine in 200 milliliters of methylene chloride are added, portionwise and with stirring over a 5-minute period, 10.3 grams (0.18 mole) of methyl isocyanate and the resultant mixture is permitted to stand at room temperature for seven days. This mixture, which contains the mixed products N - methyl-3-ethylthio-5-chloro-2-pyridylcarbamate and N-methyl-2-oxo-3-ethylthio - 5 - chloro-1(2H)-pyridylcarboxamide, is then evaporated to dryness and the residue repeatedly recrystallized from benzene to provide the N-methyl-2-oxo-3-ethylthio-5-chloro-1(2H)-pyridylcarboxamide product. This product is a white crystalline solid having a melting point of 118.5°–120° C. Elemental analysis.—Calculated for $C_9H_{10}ClN_2O_2S$ (percent): C, 43.81; H, 4.50; S, 13.0. Found (percent): C, 43.71; H, 4.42; S, 13.13.

EXAMPLE 5

Then grams (0.065 mole) of 6-ethylthio-2-pyridinol is dispersed in 300 milliliters of dimethylformamide. To this mixture is gradually added 15 grams of ethyl isocyanate over a 30-minute period. The resultant mixture is stirred an additional 30 minutes and is then set aside for 2 days. During this entire period the temperature of the mixture is maintained at from 20° to 30° C. Upon subsequent evaporation of solvent, the residue is recrystallized from toluene:diethyl ether to provide the N ethyl-6-ethylthio-2-pyridylcarbamate.

EXAMPLE 6

To a mixture of 15 grams (0.08 mole) of 3-ethylthio-5-chloro-2-pyridinol and 4 drops of triethylamine in 200 milliliters of methylene chloride are added, portionwise and with stirring over a 5-minute period, 21.4 grams (0.18 mole) of phenyl isocyanate and the resultant mixture is permitted to stand at room temperature for seven days. This mixture, which contains the mixed products N-phenyl-3-ethylthio - 5 - chloro-2-pyridylcarbamate and N-phenyl-2-oxo-3-ethylthio - 5 - chloro-1(2H)-pyridylcarboxamide, is then evaporated to dryness and the residue repeatedly recrystallized from benzene to provide the N - phenyl-2-oxo-3-ethylthio-5-chloro-1(2H)-pyridylcarboxamide product. N-phenyl-2-oxo - 3 - ethylthio-5-chloro-1(2H)-pyridylcarboxamide has a molecular weight of 308.7.

In procedures analogous to the foregoing and in accordance with the method of the present invention the following compounds of the present invention are prepared:

N-methyl-6-ethylthio - 2 - pyridylcarbamate (melting point 59.5°–61° C. Elemental analysis.— Calculated for $C_9H_{12}N_2O_2S$ (percent): C, 50.92; H, 5.70; S, 15.1. Found (percent): C, 51.12; H, 5.57; S, 15.3).

N-methyl-2-oxo-5-methylthio - 1(2H) - pyridylcarboxamide (melting point 90.5°–92° C. Elemental analysis.— Calculated for $C_8H_{10}N_2O_2S$ (percent): C, 48.52; H, 5.08. Found (percent): C, 48.40; H, 4.97).

N - ethyl - 3 - bromo-6-ethylthio-2-pyridylcarbamate (molecular weight 304.9).

N-methyl - 2 - oxo - 5 - methylsulfinyl-1(2H)-pyridylcarboxamide (melting point 128°–130° C. Elemental analysis.—Calculated for $C_8H_{10}N_2O_3S$ (percent): C, 44.85; H, 4.71; S, 14.96. Found (percent): 44.98; H, 4.51; S, 15.09).

N-ethyl-6-ethylsulfinyl-2-pyridylcarbamate (molecular weight 241.2).

N-methyl-2-oxo-5-methylsulfonyl - 1(2H) - pyridylcarboxamide (melting point 246°–247° C. Elemental analysis.—Calculated for $C_8H_{10}N_2O_4S$ (percent): C, 41.73; H, 4.38; S, 13.92. Found (percent): C, 42.02; H, 4.50; S, 13.15).

N - methyl-5-bromo-6-isobutylthio-2-pyridylcarbamate (molecular weight 319.3).

N-methyl-2-oxo-5-ethylthio - 1(2H) - pyridylcarboxamide (melting point 75°–76° C. Elemental analysis.— Calculated for $C_9H_{12}N_2O_2S$ (percent): C, 50.92; H, 5.70; S, 15.10. Found (percent): C, 50.94; H, 5.69; S, 15.04).

N-(t-butyl)-3-methylthio-2-pyridylcarbamate (molecular weight 239.4).

N-methyl-2-oxo-5-isopropylthio - 1(2H) - pyridylcarboxamide (melting point 66.5°–68° C. Elemental analysis.—Calculated for $C_{10}H_{14}N_2O_2S$ (percent): C, 53.09; H, 6.24; S, 14.17. Found (percent): C, 53.33; H, 6.07; S, 14.06).

N - methyl-3,4-dimethyl-5-bromo-6-ethylthio-2-pyridylcarbamate (molecular weight 321.2).

N-methyl-2-oxo-5-isopropylsulfinyl - 1(2H) - pyridylcarboxamide (melting point 88.5°–90.5° C. Elemental analysis.—Calculated for $C_{12}H_{14}N_2O_3S$ (percent): C, 49.56; H, 5.82; S, 13.23. Found (percent): C, 49.45; H, 6.02; S, 13.39).

N - (n-butyl)-3,4,5-trichloro-6-ethylsulfinyl-2-pyridylcarbamate (molecular weight 375.4).

N - methyl-2-oxo-5-isopropylsulfonyl-1(2H)-pyridylcarboxamide (melting point 127°–128.5° C. Elemental analysis.—Calculated for $C_{10}H_{14}N_2O_4S$ (percent): C, 46.50; H, 5.46; S, 12.41. Found (percent): C, 46.72; H, 5.43; S, 12.53).

N-ethyl-3-chloro-4-ethyl - 6 - ethylthio-2-pyridylcarbamate (molecular weight 334.2).

N-methyl-2-oxo-4,6-dimethyl - 5 - methylthio-1(2H)-pyridylcarboxamide (melting point 124°–125° C. Elemental analysis.—Calculated for $C_{10}H_{14}N_2O_2S$ (percent): C, 53.07; H, 6.24; S, 14.17. Found (percent): C, 52.5; H, 6.45; S, 13.19).

N - ethyl-5-ethylsulfonyl-2-pyridylcarbamate (molecular weight 257.3).

N-isopropyl-2-oxo-3,4,6-trichloro - 5 - methylsulfinyl-1(2H)-pyridylcarboxamide (molecular weight 345.7).

N - (n - butyl)-2-oxo-5-methylthio-6-(n-butyl)-1(2H)-pyridylcarboxamide (molecular weight 294.2).

N-isopropyl-2-oxo-3-isobutylsulfinyl - 1(2H) - pyridylcarboxamide (molecular weight 281.3).

N - (n - propyl)-2-oxo-3-ethylthio - 5 - chloro-1(2H)-pyridylcarboxamide (molecular weight 304.6).

N-ethyl-2-oxo-4,6-diisopropyl-5-ethylthio-1(2H)-pyridylcarboxamide (molecular weight 309.7), and N-phenyl-6-methylthio-2-pyridylcarbamate (molecular weight 260.3).

The compounds of the present invention are useful as parasiticides for the control of a wide variety of household and agricultural pests such as arachnids, beetles, worms, ticks, aphids, flies, ascarids, trichostrongyloids, hookworms, pinworms, screwworms and cattle grubs. For such use, the unmodified compounds can be employed. Alternatively, the compounds can be dispersed in an edible solid to prepare animal feed compositions or on an inert finely divided solid to prepare dust compositions. The latter dust compositions can be dispersed in water with or without the aid of a wetting agent and the resulting aqueous dispersions employed as sprays.

In other procedures, the compounds can be employed as a constituent in edible oils or in other oils or solvents, or as a constituent in solvent-in-water or water-in-solvent emulsions or dispersions which can be employed as sprays, drenches or washes. Good results are obtained when employing compositions containing from 50 to 10,000 parts per million of one or more of the compounds.

In separately conducted representative operations, animal feed compositions containing .01 percent by weight of one of N-methyl-2-oxo-5-methylsulfonyl-1(2H)-pyridylcarboxamide,
N-methyl-2-oxo-3-ethylthio-5-chloro-1(2H)-pyridylcarboxamide,
N-methyl-2-oxo-5-ethylthio-1(2H)-pyridylcarboxamide,
N-methyl-2-oxo-5-isopropylsulfonyl-1(2H)-pyridylcarboxamide,
N-methyl-2-oxo-5-isopropylsulfinyl-1(2H)-pyridylcarboxamide,
N-methyl-6-ethylthio-2-pyridylcarbamate,
N-methyl-6-ethylsulfinyl-2-pyridylcarbamate, and
N-methyl-6-ethylsulfonyl-2-pyridylcarbamate give substantially 100 percent controls of ascarids, hookworms, trichostrongyloids, pinworms and tapeworms.

In further representative operations, aqueous compositions containing 500 parts per million by weight of one of N-methyl-2-oxo-3-ethylthio-5-chloro-1(2H)-pyridylcarboxamide and N - methyl - 2-oxo-5-methylsulfinyl-1(2H)-pyridylcarboxamide give substantially complete controls and kills of American cockroaches.

The substituted pyridinols employed as starting materials as set forth in the foregoing teachings can be prepared in accordance with known procedures. In one convenient manner, substantially equimolecular proportions of a cuprous mercaptide of the formula

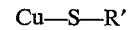

and asuitable 2-pyridinol containing at least one ring halogen atom are reacted together in a solvent such as lutidine or pyridine to produce the corresponding substituted 2-pyridinol containing one lower alkylthio grouping as a replacement of a halogen atom. These are represented by Formula C above wherein one R is lower alkylthio at one of ring positions 3, 5, or 6 and the remaining R's represent hydrogen, bromo, chloro, or lower alkyl. These substituted 2-pyridinols containing such lower alkylthio grouping can be employed as starting materials or thereafter oxidized with hydrogen peroxide to the corresponding sulfinyl bearing pyridinols which, in turn, can be employed as starting materials herein or be similarly oxidized to the sulfonyl bearing pyridinol starting compounds. These latter two groups of starting pyridinols are represented above by Formula C in which one R is a sulfinyl grouping or a sulfonyl grouping, respectively, appearing at one of ring positions 3, 5, or 6.

Suitable starting pyridinols include 6-isobutylsulfonyl-2-pyridinol, 6-methylthio-2-pyridinol, 5-isopropyl-6-methylsulfonyl-2-pyridinol, 6-isopropylsulfonyl-2-pyridinol, 3-(n-pyropylthio)-2-pyridinol, 3-ethylsulfonyl - 5 - ethyl - 2-pyridinol, 5-methyl-6-methylthio-2-pyridino, 5-methylthio-2-pyridinol, 5-ethylsulfinyl-2-pyridinol, and so forth.

The procedures described as well as other procedures for the preparation of these starting materials are carefully documented and set forth in U.S. Patent No. 3,335,146.

The isocyanate starting materials are likewise prepared by known procedures. In one such procedure, a primary amine of the formula R'NH

is subjected to a vapor phase reaction with phosgene to produce the carbamyl chloride of the formula R'NHCOCl

This is then refluxed in an inert solvent or is treated with a tertiary amine hydrogen chloride acceptor to produce the desired and corresponding isocyanate.

What is claimed is:
1. A compound of the formula:

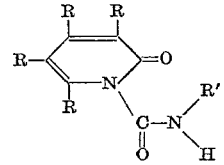

wherein, in each formula, R' represents lower alkyl, phenyl, or o-tolyl and one R on each ring moiety represents lower alkylthio, lower alkylsulfinyl or lower alkylsulfonyl which occupies one of the 3, 5, or 6 positions of the ring moiety and the remaining R's represent hydrogen, bromo, chloro, or lower alkyl.

2. The compound claimed in claim 1 which is N-methyl-2-oxo-5-methylsulfonyl-1(2H)pyridylcarboxamide.

3. The compound claimed in claim 1 which is N-methyl-2-oxo-5-methylsulfinyl-1(2H)pyridylcarboxamide.

4. The compound claimed in claim 1 which is N-methyl-2-oxo-5-ethylthio-1(2H)pyridylcarboxamide.

5. The compound claimed in claim 1 which is N-methyl-2-oxo-3-ethylthio - 5 - chloro - 1(2H) - pyridylcarboxamide.

6. The compound claimed in claim 1 which is N-methyl-2-oxo - 5 - isopropylfulfinyl - 1(2H) - pyridylcarboxamide.

7. The compound claimed in claim 1 which is N-methyl-2-oxo - 5 - isopropylfulfonyl - 1(2H) - pyridylcarboxamide.

References Cited

UNITED STATES PATENTS 3,221,019  11/1965  Biel et al. _____ 260—295

HENRY R. JILES, Primary Examiner

A. L. ROTMAN, Assistant Examiner

U.S. Cl. X.R.

260—294.8; 424—266